Figure 1:
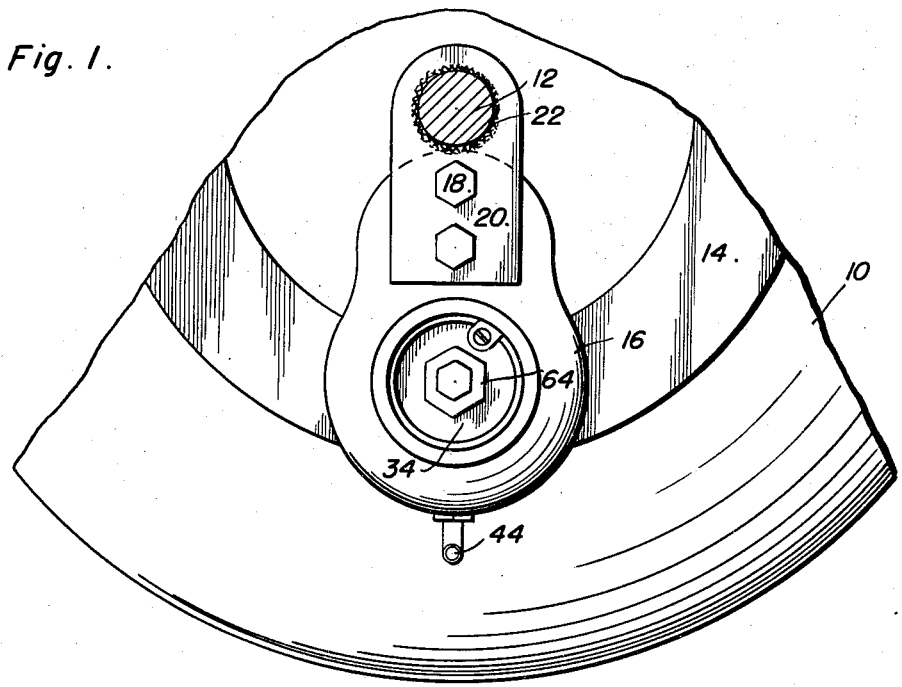

Oct. 18, 1949.                    T. T. CAGLE                        2,485,086
                    WHEEL BRAKE ASSEMBLY WITH ADJUSTABLE
                              RELEASING MEANS
                          Filed March 15, 1948

Toby T. Cagle
INVENTOR.

Patented Oct. 18, 1949

2,485,086

UNITED STATES PATENT OFFICE 2,485,086

WHEEL BRAKE ASSEMBLY WITH ADJUSTABLE RELEASING MEANS

Toby T. Cagle, Idaho Falls, Idaho

Application March 15, 1948, Serial No. 14,879

4 Claims. (Cl. 188—152)

This invention relates to a brake assembly and more particularly to a hydraulically actuated brake assembly conventionally employed on airplanes, such as the light pleasure crafts.

Known assemblies employed by the majority of the pleasure and smaller passenger crafts, at this time, comprise a non-rotating axle, having a rotatable wheel mounted thereon, with a rotating brake disk contiguous therewith. A housing is secured to the axle adjacent the inner hub of the wheel and has an integral arm extending on the outer side of the brake disk. A fixed or stationary brake block is held by this arm in cooperating alignment with a movable or actuating brake block, which is actuated into engagement with the rotating brake disk, through the medium of a pressure actuating piston, which is slidably mounted in the housing and which is responsive to pressure created in the housing, through a fluid chamber communicating with a piston control master cylinder. Thus, when the brake pedal in the cockpit is depressed, operating the master cylinder piston, pressure is applied to the pressure responsive piston in the housing and the piston operates to create a brake applying pressure, advancing the movable brake block into engagement with the brake disk. However, when pressure is released, the actuating piston fails to completely release or retrieve, causing a continuous pressure on the movable brake block, which causes a drag, holding back the plane in taxiing and take-off. The drag created causes a squeaking and heating up of the brake unit and thus labors the engine and increases the taxiing distance necessary for take-off.

Thus, this invention has for its primary object to obviate and eliminate completely the squeaking or dragging defect in the above noted assembly.

Another object of this invention is to enable the actuating piston to be positioned in the housing, relative to a pressure responsive placement, thus effecting a predetermined amount of brake applying pressure.

A meritorious feature of this invention resides in the provision of a piston return unit, which is resiliently connected between the piston and the housing and which, responsive to a decrease in the fluid pressure in the housing yieldingly biases the piston from the braking pressure block.

Another meritorious feature of this invention resides in the provision of a cylinder, which is adjustably received within the housing and within which is slidably positioned a shaft, having one end anchored to the actuating piston and which responsive to a decrease in pressure in the housing and to the actuation of a resilient element received on its shank, releases the piston from brake pressure engagement with the movable brake block.

Another object of this invention to be specifically herein enumerated resides in the provision of a piston return unit, which is easily and conveniently installed in a brake assembly, of the type above noted, which is efficient in operation and durable in use.

Figure 2:
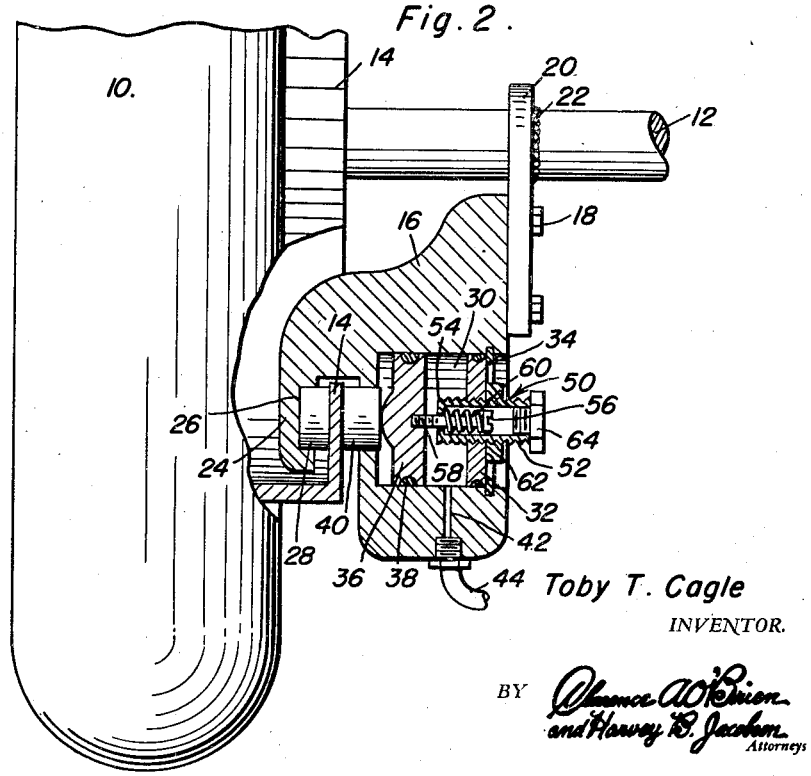

These and ancillary objects and other meritorious features are attained by this invention, a preferred embodiment of which is set forth in the following description and illustrated in the accompanying drawings, wherein:

Figure 1 is a fragmentary elevational view of an airplane wheel and contiguous brake disk, illustrating a conventional brake actuating hydraulic housing and assembly, with this invention attached thereto, and, Figure 2 is a front elevational view of a fragmentary portion of an airplane wheel and axle, illustrating the hydraulic actuating housing and piston return unit in vertical sectional view.

Referring now more particularly to the drawing, wherein similar characters of reference designate corresponding parts throughout, there is shown a fragmentary portion of an airplane wheel 10, of conventional structure, which is rotatably mounted on a fixed or non-rotating axle 12, with a contiguous circular brake disk 14 attached to the inner hub portion of the wheel and adapted to rotate therewith.

A housing 16, of any suitable type or material, being conventional in design and purpose, is secured by means of bolt assemblies 18 to an attaching axle plate 20, having an extending apertured terminal, which is received on the axle 12, and suitably secured as by welding 22 or the like thereto. The housing 16 comprises a main body and an extending angular arm 24 having a suitable opening 26 formed in the inner face thereof, within which is secured a brake disk or block 28, of suitable lining or braking material.

Formed in the main portion or body section of the housing 16, in transverse alignment with the stationary or fixed brake block 28 is a chamber 30, within which is positioned a fixed or stationary brake piston 32, the brake piston being locked in the cylinder by means of the lock ring 34 which extends into suitable recesses, offset into the casing body from the chamber. Suitably positioned in the chamber is a movable thrust piston 36, which is moved in the chamber, responsive to pressure created therein, as will be described.

Suitable ring seals 38 are provided around the periphery of the piston 36 to aid in the sliding movement in the cylindrical chamber 30. Disposed in alignment with the raised actuating portion of the thrust piston 36 and in alignment with the stationary or fixed brake bar 28 is a movable block 40, which is movably positioned in an opening suitably formed in the body section. A communicating passage or bore 42 communicates transversely with the cylindrical chamber 30 and a connecting fluid tube 44 is connected thereto, the opposite end of the connecting tube 44 being connected to a master cylinder, not shown, and of conventional structure and purpose.

In operation, upon depression of the pedal in the cockpit, which moves the piston in the master cylinder, pressure is established in the chamber 30 rearwardly of the piston 36. The piston 36, being responsive to the pressure in the one portion of the chamber, coincidentally and correspondingly is moved into engagement with the movable brake block 40 and creates a brake applying pressure. The movable brake block 40 is moved into braking engagement with the rotating brake disk 14 in association with the fixed block 28, thus braking the momentum of the wheel 10.

However, upon release of the master cylinder piston pedal and the decrease of pressure in the chamber 30, the piston 36 should move out of engagement with the movable block 40 and allow the block 40 to release engagement with the disk 14, thus obviating any drag or locking action.

To secure the proper piston action, there is provided a piston return unit, generally designated by the character reference 50, which comprises an exteriorly threaded cylinder 52, which is suitably positioned in a central bore formed in the ring 34 and in the stationary piston 32, so that a portion of the threaded cylinder extends into the chamber 30 and extends exteriorly of the housing 16, as seen in Figure 2 of the drawings. The inserted end of the cylinder 52 is substantially closed and has a central opening 54 formed therein. Slidably positioned within the cylinder 52 is a headed shaft 56, having an extending threaded terminus 58, which is suitably secured within an axially threaded bore centrally disposed in the rear portion of the actuating piston 36. A compression spring 60 is received around the shank of the shaft 56, within the cylinder 52 and is held between the head portion of the shaft and the enclosed end 54 of the cylinder. A lock nut 62 is received around the exteriorly threaded cylinder and serves to lock the cylinder in the desired adjusted position. A cap nut and seal assembly 64 is received within the exteriorly extending portion of the cylinder.

In operation, when the master cylinder piston is returned to inoperative placement, due to release of the cockpit pedal, the pressure in the rear portion of the chamber 30 is decreased and the piston 36 responsive to the urgement of the spring 60 moves rearwardly relative to the cylinder 52. Thus, the movable block 40 is released from braking engagement with the disk 14 in association with the fixed block 26 and any possibility of drag or squeaking is obviated.

It is to be noted that by adjusting the cylinder 52, relative to the extent of the inserted end 54 in the chamber 30, the throw of the brake pedals in the cockpit can be adjusted to the desired use, as the amount of pressure needed to actuate the piston 36 may be controlled by the pressure receptive placement of the piston 36 in the chamber 30.

Thus, it can be seen that there is provided an efficient piston returning unit, which in association with the above described and conventional hydraulic airplane brake actuating assembly, serves to obviate the tendency of the assembly to produce a drag or squeaking effect and to cause serious harm to the airplane motor and to the ground movement of the plane in taxiing or landing operations. However, since many other objects and purposes of this invention will become apparent to those skilled in the art, upon a perusal of the foregoing description, in view of the accompanying drawings, it is to be understood that certain changes may be effected therein, without a departure from the spirit of the invention and within the scope of the appended claims.

Having described the invention what is claimed as new is:

1. In an airplane having a fixed non-rotatable axle and a rotatable wheel and contiguous brake disk mounted thereon, the combination with a hydraulic brake assembly including a housing secured to the axle, an extending arm carried by said housing, a fixed brake block on said arm engaging one side of the brake disk, a fluid chamber in said housing, a movable brake block in alignment with said chamber, a piston slidably mounted in said chamber and responsive to a brake applying pressure in one portion of the chamber for imparting a brake applying pressure to the movable block; of a cylinder adjustably secured in the inner end of the housing and having one end inserted in said chamber, a plug disposed in the outer end of the cylinder, a connecting member slidably disposed in said cylinder and having one end anchored to the piston, resilient means disposed about the portion of the connecting member housed within the cylinder.

2. In an aircraft having a wheel assembly and contiguous brake disc mounted therein, the combination with a hydraulic brake assembly including a housing secured to the wheel axle, an extending arm carried by said housing, a fixed brake block on said arm engaging one side of the brake disc, a fluid chamber in said housing, a movable brake block disposed in alignment with said chamber, a piston slidably mounted in said chamber and responsive to a brake applying pressure in one portion of the chamber for imparting a brake applying pressure to the movable block, of a tubular casing adjustably threaded in the inner end of the housing and having its inner end protruding into the chamber, a connecting member slidably disposed in said cylinder and having one end disposed through the inner end of the casing and embedded in the piston, resilient means disposed about the portion of the connecting member within the casing, a plug detachably disposed in the outer end of the casing, an enlarged head on the inner end of the connecting member, said resilient means being positioned on the connecting member between the inner end of the casing and the head of the connecting member.

3. In an airplane having a fixed non-rotatable axle and rotatable wheel having a contiguous brake disk mounted thereon, the combination with a hydraulic brake assembly including a housing depending from said axle, an extending arm carried by said housing, a fixed brake block on the extremity of the arm engageable with one side of the brake disk, said housing having a fluid chamber therein, a movable brake block in said housing and in alignment with said fixed block, a piston slidably mounted in said chamber and responsive to pressure in one portion of the chamber for imparting a brake applying pressure to the movable block; of a mechanical connection between said housing and the piston, means carried by said connection for biasing said piston from the movable block upon a decrease in pressure in the chamber, said means including an axial bore formed in said piston, said housing being formed with an opening in alignment with the bore, a cylinder adjustably inserted in said housing opening, a shaft slidably mounted in said cylinder and having one end anchored in said piston bore, means received on the portion of said shaft within the cylinder for actuating said shaft and piston upon a decrease of pressure in the chamber, and means for positioning said piston in pre-selected pressure receptive positions.

4. In an airplane having a fixed non-rotatable axle and rotatable wheel having a contiguous brake disk mounted thereon, the combination with a hydraulic brake assembly including a housing depending from said axle, an extending arm carried by said housing, a fixed brake block on the extremity of the arm engageable with one side of the brake disk, said housing having a fluid chamber therein, a movable brake block in said housing and in alignment with said fixed block, a piston slidably mounted in said chamber and responsive to pressure in one portion of the chamber for imparting a brake applying pressure to the movable block; of a mechanical connection between said housing and the piston, means carried by said connection for biasing said piston from the movable block upon a decrease in pressure in the chamber and means for positioning said piston in pre-selected pressure receptive positions, said last means including a cylinder adjustably threaded in said housing and having one end protruding into said chamber, a connecting member slidably disposed in said cylinder and anchored in the piston.

TOBY T. CAGLE.

REFERENCES CITED

The following references are of record in the file of this patent:

UNITED STATES PATENTS

| Number | Name | Date |
|---|---|---|
| 2,256,725 | Pierce et al. | Sept. 23, 1941 |
| 2,351,041 | Hawley | June 13, 1944 |
| 2,419,113 | Bricker | Apr. 15, 1947 |

FOREIGN PATENTS

| Number | Country | Date |
|---|---|---|
| 274,144 | Great Britain | July 20, 1927 |